(12) United States Patent
Newman et al.

(10) Patent No.: US 8,549,639 B2
(45) Date of Patent: Oct. 1, 2013

(54) METHOD AND APPARATUS FOR DIAGNOSING AND MITIGATING MALICIOUS EVENTS IN A COMMUNICATION NETWORK

(75) Inventors: Scott Newman, Little Elm, TX (US); Michael Gooch, Forney, TX (US); John-Paul Roadman, Carrollton, TX (US); Jon Paden, Austin, TX (US); Richard Chuck Rhoades, Decatur, TX (US)

(73) Assignee: AT&T Intellectual Property I, L.P., Atlanta, GA (US)

( * ) Notice: Subject to any disclaimer, the term of this patent is extended or adjusted under 35 U.S.C. 154(b) by 1272 days.

(21) Appl. No.: 11/204,450

(22) Filed: Aug. 16, 2005

(65) Prior Publication Data

US 2007/0044152 A1    Feb. 22, 2007

(51) Int. Cl.
*H04L 29/06* (2006.01)

(52) U.S. Cl.
USPC .............. 726/23; 726/24; 726/25; 713/188

(58) Field of Classification Search
USPC ............... 714/57; 726/2, 25, 24, 23; 705/10; 713/188
See application file for complete search history.

(56) References Cited

U.S. PATENT DOCUMENTS

| | | | |
|---|---|---|---|
| 5,440,723 A | 8/1995 | Arnold et al. | |
| 6,477,667 B1 * | 11/2002 | Levi et al. | 714/57 |
| 6,715,083 B1 | 3/2004 | Tovander | |
| 6,873,988 B2 | 3/2005 | Herrmann et al. | |
| 7,007,302 B1 * | 2/2006 | Jagger et al. | 726/25 |
| 7,069,451 B1 | 6/2006 | Ginter et al. | |
| 7,194,756 B2 | 3/2007 | Addington et al. | |
| 7,318,234 B1 * | 1/2008 | Dharmarajan | 726/2 |
| 7,484,245 B1 | 1/2009 | Friedman et al. | |
| 2001/0040892 A1 | 11/2001 | Spencer | |
| 2002/0087882 A1 | 7/2002 | Schneier et al. | |
| 2003/0014644 A1 | 1/2003 | Burns et al. | |
| 2003/0105973 A1 | 6/2003 | Liang et al. | |

(Continued)

FOREIGN PATENT DOCUMENTS

| | | |
|---|---|---|
| WO | WO 03/014932 A2 | 7/2002 |
| WO | WO 03/063431 A2 | 1/2003 |
| WO | WO 2004/038594 A1 | 5/2004 |
| WO | WO 2005057233 | 6/2005 |

OTHER PUBLICATIONS

U.S. Official Action dated Apr. 3, 2009 in U.S. Appl. No. 11/157,774.

(Continued)

*Primary Examiner* — Jeffrey Pwu
*Assistant Examiner* — Thong Truong
(74) *Attorney, Agent, or Firm* — Hartman & Citrin LLC

(57) ABSTRACT

A controller (104) for managing operations of a communication network has a communication element (202) for monitoring data traffic of an IP address in the communication network and for controlling operations of the communication network, a memory for storage (204), and a processor (206) for controlling operations of the communication element, and the memory. The processor is programmed to select (302) an IP (Internet Protocol) address to analyze, monitor (304) for the effects of malicious software originating from the IP address utilized by one or more customers, detect (306) a suspected malicious event, and restrict (312) Internet access to one or more customers suspected of interrupting service of the communication network.

10 Claims, 4 Drawing Sheets

(56) References Cited

U.S. PATENT DOCUMENTS

| | | |
|---|---|---|
| 2003/0115483 A1 | 6/2003 | Liang |
| 2003/0200464 A1 | 10/2003 | Kidron |
| 2004/0015386 A1* | 1/2004 | Abe et al. ..................... 705/10 |
| 2004/0107362 A1 | 6/2004 | Ravishankar et al. |
| 2004/0158741 A1* | 8/2004 | Schneider ..................... 713/201 |
| 2004/0205419 A1 | 10/2004 | Liang et al. |
| 2004/0255165 A1 | 12/2004 | Szor |
| 2005/0015622 A1 | 1/2005 | Williams et al. |
| 2005/0027723 A1 | 2/2005 | Jones et al. |
| 2005/0091538 A1 | 4/2005 | Hoche et al. |
| 2006/0026466 A1 | 2/2006 | Pozarycki et al. |
| 2006/0056287 A1 | 3/2006 | Paden et al. |
| 2006/0161987 A1* | 7/2006 | Levy-Yurista .................. 726/24 |
| 2006/0288417 A1 | 12/2006 | Bookbinder et al. |
| 2007/0044152 A1 | 2/2007 | Newman et al. |

OTHER PUBLICATIONS

U.S. Official Action dated May 12, 2009 in U.S. Appl. No. 11/157,774.

U.S. Official Action dated Sep. 17, 2009 in U.S. Appl. No. 11/157,774.

U.S. Official Action dated May 25, 2010 in U.S. Appl. No. 11/157,774.

U.S. Official Action dated Nov. 8, 2010 in U.S. Appl. No. 11/157,774.

* cited by examiner

METHOD AND APPARATUS FOR DIAGNOSING AND MITIGATING MALICIOUS EVENTS IN A COMMUNICATION NETWORK

RELATED APPLICATION

U.S. patent application Ser. No. 11/157,774 filed Jun. 21, 2005 by Bookbinder et al., entitled "Method and Apparatus for Mitigating the Effects of Malicious Software in a Communication Network."

FIELD OF THE INVENTION

The present disclosure relates generally to malicious Internet activities, and more specifically to a method and apparatus for diagnosing and mitigating malicious events in a communication network.

BACKGROUND

Malicious software, such as viruses and worms, has been known to create bot networks, cause spamming, and other destructive activities. A bot, also referred to as a remote-access Trojan program, seeks out and places itself on computers running silently in the background, thereby allowing the attacker to operate the computer while the owner is unaware. Such computers are generally referred to as zombies, which in the aggregate can be manipulated to cause havoc to communication networks by way of excessive message congestion along with furthering the spread of malicious software to other computers.

Many products have been developed to monitor and remove malicious software. Although these products have proven useful, they have failed to provide a holistic solution for protecting large communication networks and its customers.

A need therefore arises for a method and apparatus for diagnosing and mitigating malicious events in a communication network.

DETAILED DESCRIPTION OF THE DRAWINGS

Figure 1:
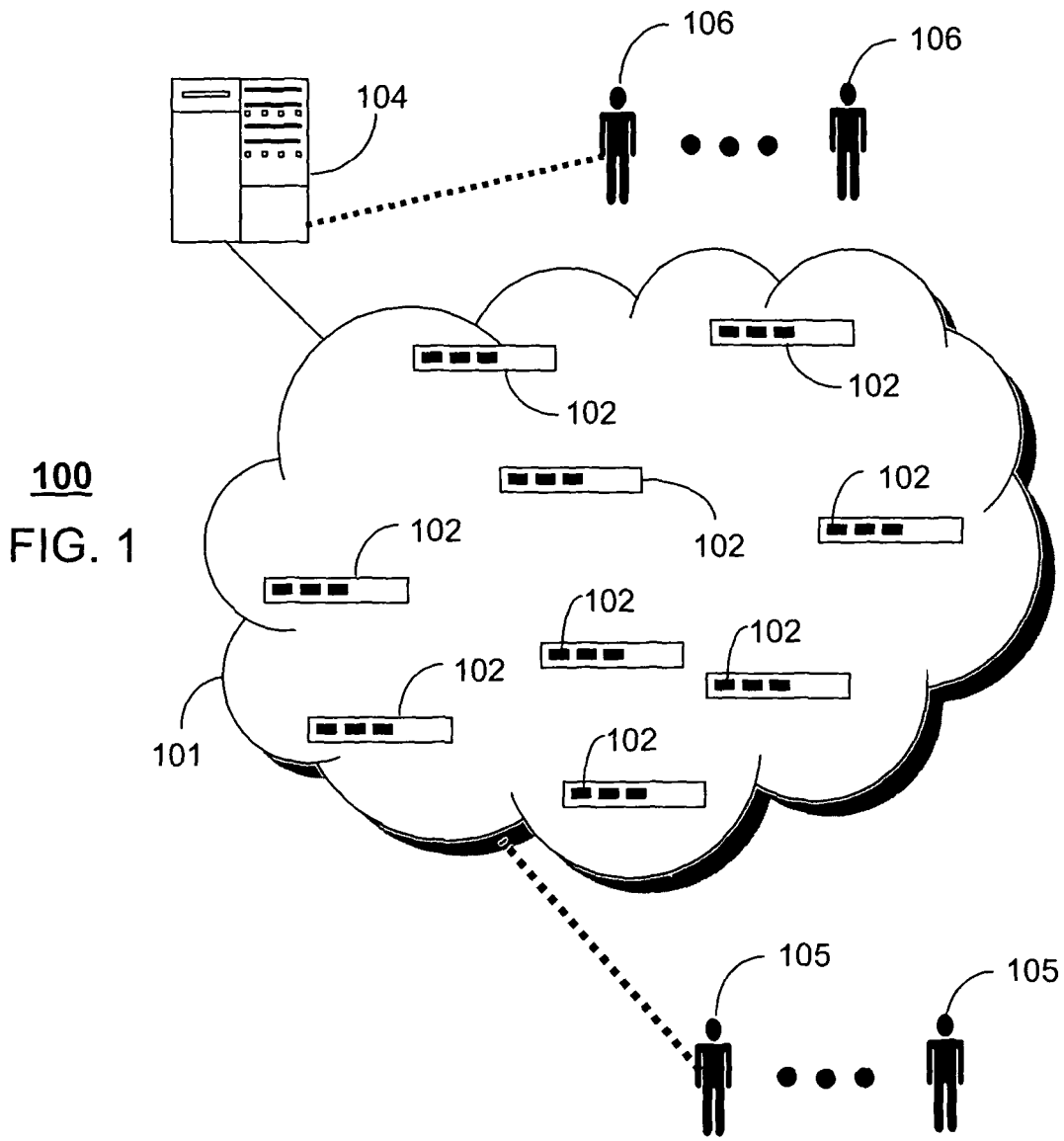
FIG. 1 is a block diagram of a controller managing a communication network incorporating teachings of the present disclosure.
Figure 2:
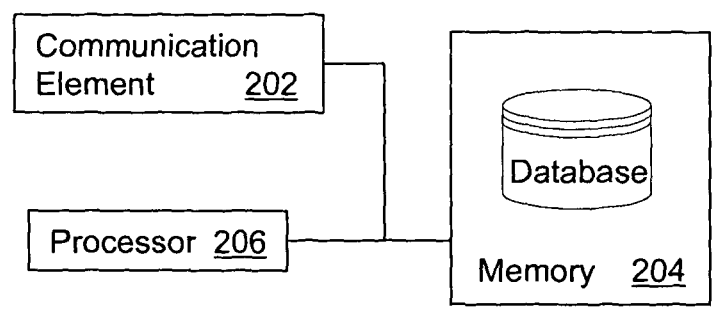
FIG. 2 is a block diagram of the controller incorporating teachings of the present disclosure.

FIG. 1 is a block diagram 100 of a controller 104 managing a communication network 101 incorporating teachings of the present disclosure. The communication network 101 includes a number of conventional network elements 102 for providing communication services to customers of the service provider of said network. The communication network 101 and its sub elements 102 support Internet services utilizing known (and future) technologies such as IP (Internet Protocol), MPLS (multi-protocol label switching), and FR/ATM (Frame Relay/Asynchronous Transfer Mode), just to mention a few.

The controller 104 manages the network elements 102 of the communication network 101. The controller 104 comprises a communication element 202, a memory 204, and a processor 206. The communication element 202 utilizes conventional communication technology for monitoring data traffic in the communication network 101. Said communication element 202 can also be used for controlling operations of the network elements 102 of the communication network 101. The processor 206 can include one or more conventional computers or servers for controlling operations of the communication network 101. The memory 104 utilizes one or more conventional media devices (such as a high capacity disk drives, Flash memory, Dynamic Random Access Memory, Random Access Memory or other like memories) for storage purposes, and can be used for managing a database of a service provider of said communication network 101.

The controller 104 can have several functional embodiments including an IVR (Interactive Voice Response) system, a CRM (Customer Relationship Management) system, an ACD (Automatic Call Distributor) for routing customers to selected agents, and combinations thereof that operate according to teachings of the present disclosure. These embodiments can also operate as independent units located in multiple geographical sites cooperating amongst each other in accordance with the present disclosure. Additionally, the controller 104 can interact with customers 105 of the communication network 101 by way of the IVR system and/or via an Internet web site, and can interconnect said customers with support personnel 106 serving as agents of the service provider of the communication network 101. These agents include customer support, technical support, or other specialized personnel employed by the service provider to support the methods of the present disclosure.

Figure 3:
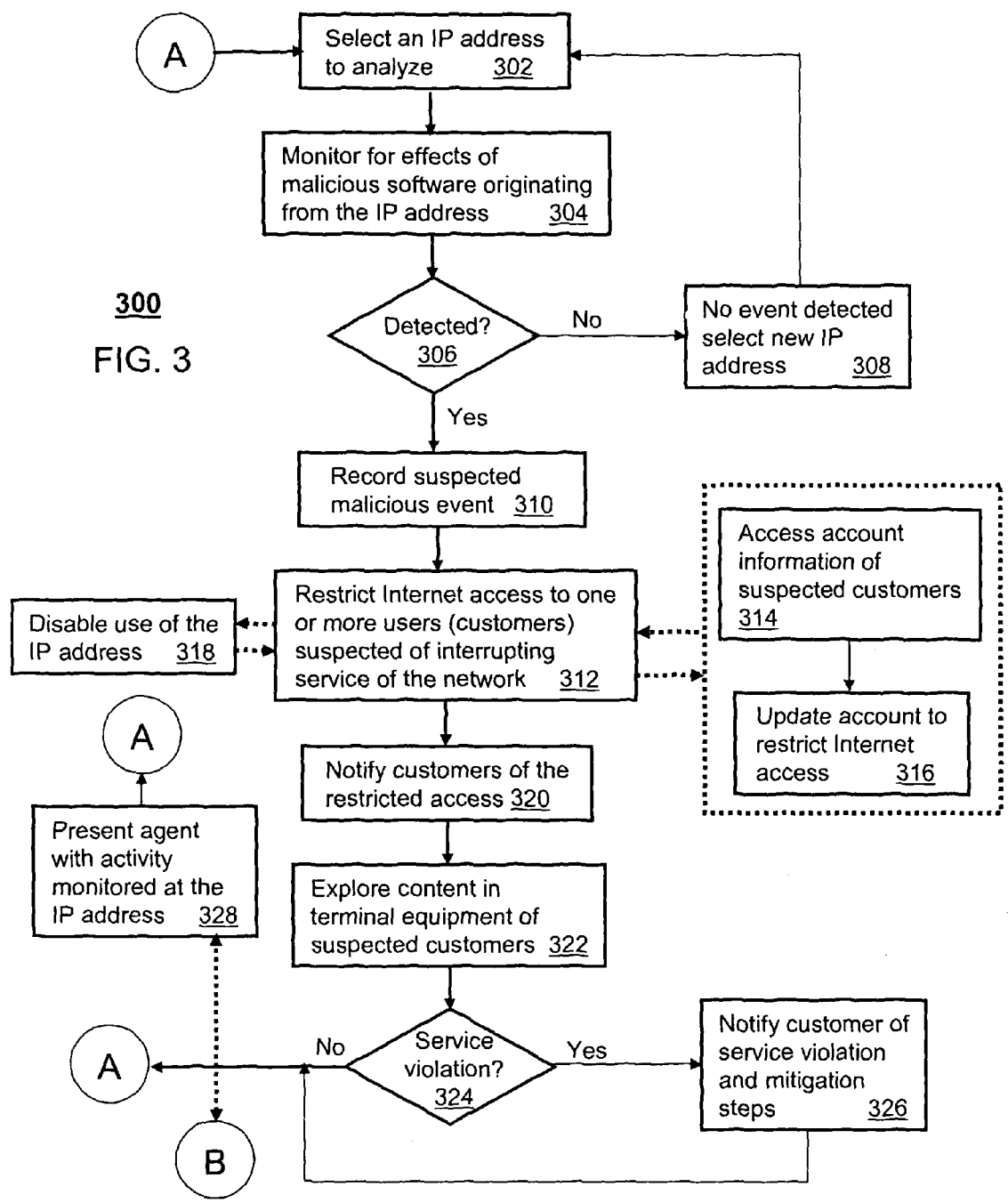
FIGS. 3-4 depict flowcharts of a method operating in the controller according to teachings of the present disclosure.
Figure 4:
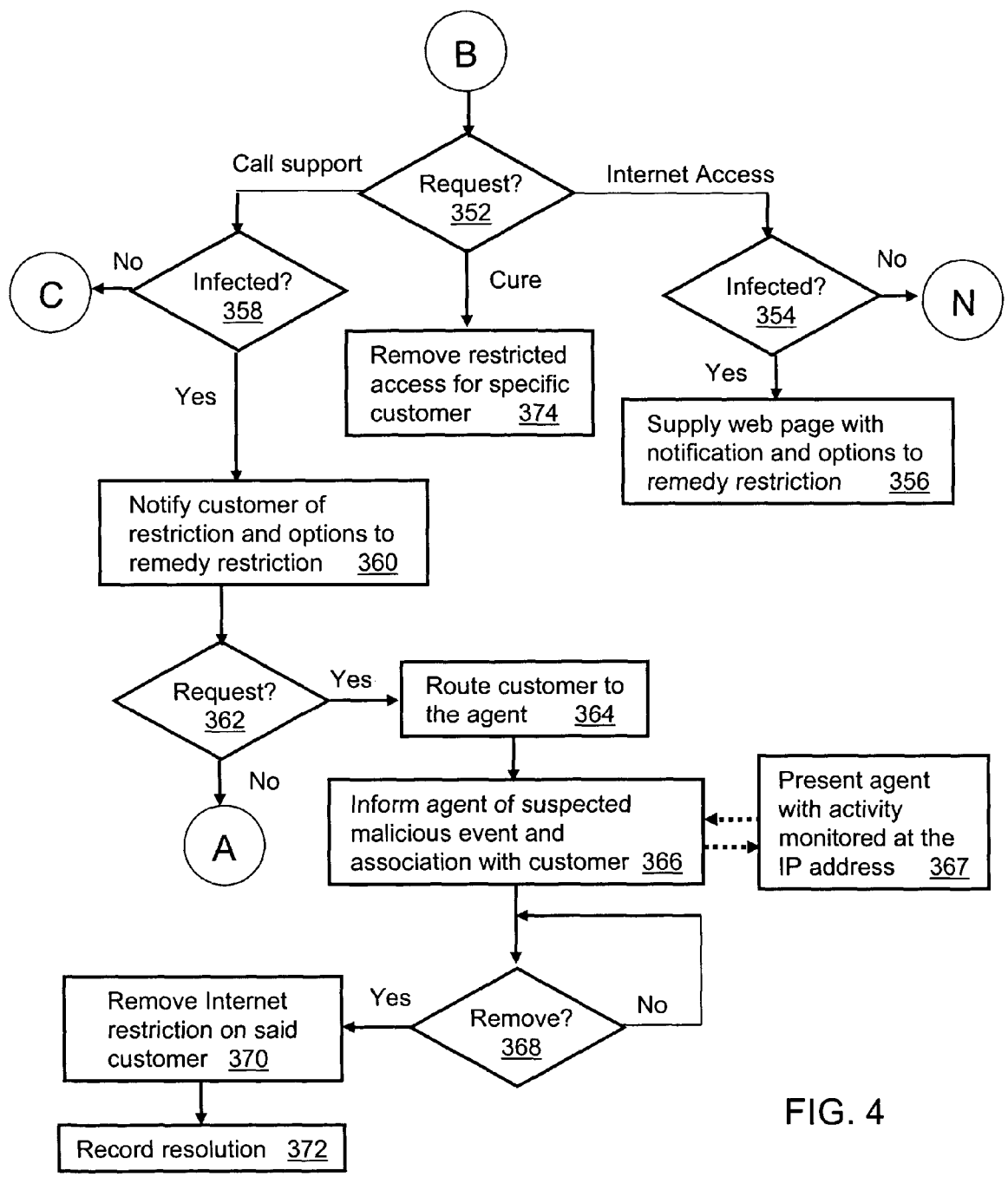

A function of the controller 104 is to diagnose and mitigate effects of malicious events in the communication network 101. FIGS. 3-4 depict flowcharts of a method 300 for executing said function in the controller 104 according to teachings of the present disclosure. Method 300 begins with step 302 in which the controller 104 is programmed to select an IP address to analyze. This step can be invoked by an agent of the service provider, or by way of an automation routine that randomly (or through conventional selection algorithms) monitors the network 101. In step 304, the network 101 is monitored by the controller 104 for malicious activity originating from the IP addressed used by one or more customers. Any conventional existing or future software for detecting malicious activities at a select IP address can be utilized in this step. If no malicious events are detected in step 306, the controller 104 proceeds to step 308 where it notifies the software of step 302 and/or an agent invoking step 302 that no malicious activity has been detected at the select IP address.

If, on the other hand, a malicious event is detected, the controller 104 proceeds to step 310 where it records in the CRM of memory 204 the suspected malicious event, and restricts Internet access in step 312 to one or more customers suspected of interrupting service of the network 101 at the selected IP address. A possible embodiment for step 312 is shown in the processes of steps 314 and 316. In step 314 the controller 104 is programmed to access account information of suspected customers, and updates said account to restrict Internet access in step 316. Step 316 also causes the controller 104 to notify one or more network elements 102 of the restricted access for said customer(s). Other conventional blocking mechanisms can, of course, be used to restrict Internet access.

The term "restrict" in the present context can mean limited access to the Internet (e.g., website access with restricted use) or no Internet access whatsoever. As a supplemental embodiment, the controller 104 can also disable use of the IP address as shown in step 318. This embodiment can be useful when the malicious activity detected is due to one or more users who have selectively attacked an IP address by inducing, for example, an unusually high traffic of packet data on said IP address, thereby slowing or interrupting service of other users utilizing the same address.

In step 320, the suspected customers can be notified of the restricted access. Subsequently, the controller 104 can be programmed to explore in step 322 content in the terminal equipment of said customers for a terms of service (TOS) violation. If a TOS violation is detected in step 324, the controller 104 proceeds to step 326 where it notifies the customers of the service violation with proposed mitigation steps. A TOS violation can include, for example, a detected virus or bot operating in the customer's computer, or a customer with an out-of-date OS (Operating System), virus protection software, software patches, or other pertinent software requirements for appropriate use of the service provider's network.

If there is no TOS violation, the controller 104 can proceed in a first embodiment back to step 302 and repeat the foregoing method 300, or proceed to step 328 in a second embodiment, or proceed to step 352 of FIG. 4 in a third embodiment. Step 328 can be useful when an agent invokes step 302. A portion or all of the activity monitored at the IP address selected by the agent can be presented to the agent for additional analysis. For an agent with a high priority for viewing customer data (which can be programmed by the service provider), all information including sensitive information (such as CRM data containing name of customer, home address, customer phone number, customer account information, etc.) of the suspected customer(s) is presented. For lower priority agents, the presentation can be limited to essential results such as a detected malicious event and/or TOS violation.

The controller 104 can also proceed to step 352 where one of several requests can come from any number of customers (including those notified of a restriction in step 320). In one instance, one or more customers can request access to the Internet after the restriction in step 312 has been established. The controller 104 processes this request by determining in step 354 from the CRM if the terminal equipment submitting the request is a source of the suspected malicious event. If not, the controller 104 supplies the caller a normal access to the Internet (identified by reference "N"), and returns to step 302 for initiating a new diagnostic cycle. Otherwise, the controller 104 supplies in step 356 a special web page with notification of the restricted access and one or more options to remedy the suspected malicious software operating in the terminal equipment of the customer.

The options can include, but are not limited to, providing a selection of downloadable software solutions that the customer can acquire for free (or at a charge) to remedy the TOS violation and/or remove the suspected software virus, providing contact information for customer service support, and/or technical support, and accepting requests from the one or more customers to remove the restricted access on the basis of mitigation steps taken by said customers. Accordingly, a customer who initiates self-help actions by downloading virus protection software to remove the malicious software (or other software to comply with the TOS) can subsequently submit a request in step 352 by way of this web page (or an IVR—Interactive Voice Response System) to remove the restriction in step 374. In this step the controller 104 can remove the restriction on a probationary basis by observing future behaviors of said terminal equipment before removing the alert information recorded in the CRM.

Alternatively, the customer can call a support center of the service provider in step 352. In this embodiment, the IVR system of the controller 104 is used for interacting with the customer. The IVR in step 358 checks whether the calling customer has terminal equipment that is a source of a malicious event as recorded in the CRM. If it is not, then the IVR directs the caller to a regular call center for customer support (designated by reference "C"), and then proceeds to step 302 for starting a new diagnostic cycle. If, however, the caller is a suspected customer, then the IVR proceeds to step 360 where it notifies the customer of the customer support and technical support centers available to assist her. In step 362 the customer can choose to forego such service, or proceed to routing the customer to a selected agent at step 364.

Depending on the expertise of the agent, the service may or may not be provided to the customer for free. The agent in turn is informed by the controller 104 by way of its CRM of the situation relating to the calling customer in step 366. In step 367, the agent can be presented with the activity monitored at the IP address in whole or in part according to the agent's priority level for viewing sensitive information. The agent can proceed to assist the customer in remedying the infected terminal, or if further expertise is required, route the caller to other technical support personnel. If the malicious software is successfully removed in step 368, then the agent proceeds to step 370 where it instructs the controller 104 to remove the restricted Internet access. Additionally, the agent further instructs the controller 104 to record in the CRM the resolution in step 372.

In the foregoing embodiments the term "Internet" should be construed loosely. That is, the present disclosure can be applied in any network independent of security boundaries (such as firewalls) installed by customers. The term Internet can therefore mean Intranet and Extranet. Thus, the present disclosure can be applied to any network element 102 manageable by the aforementioned controller 104. It should also be noted that a portion of the foregoing steps of method 300 can be implemented as background processes while others operate as foreground applications with dependencies thereto.

Figure 5:
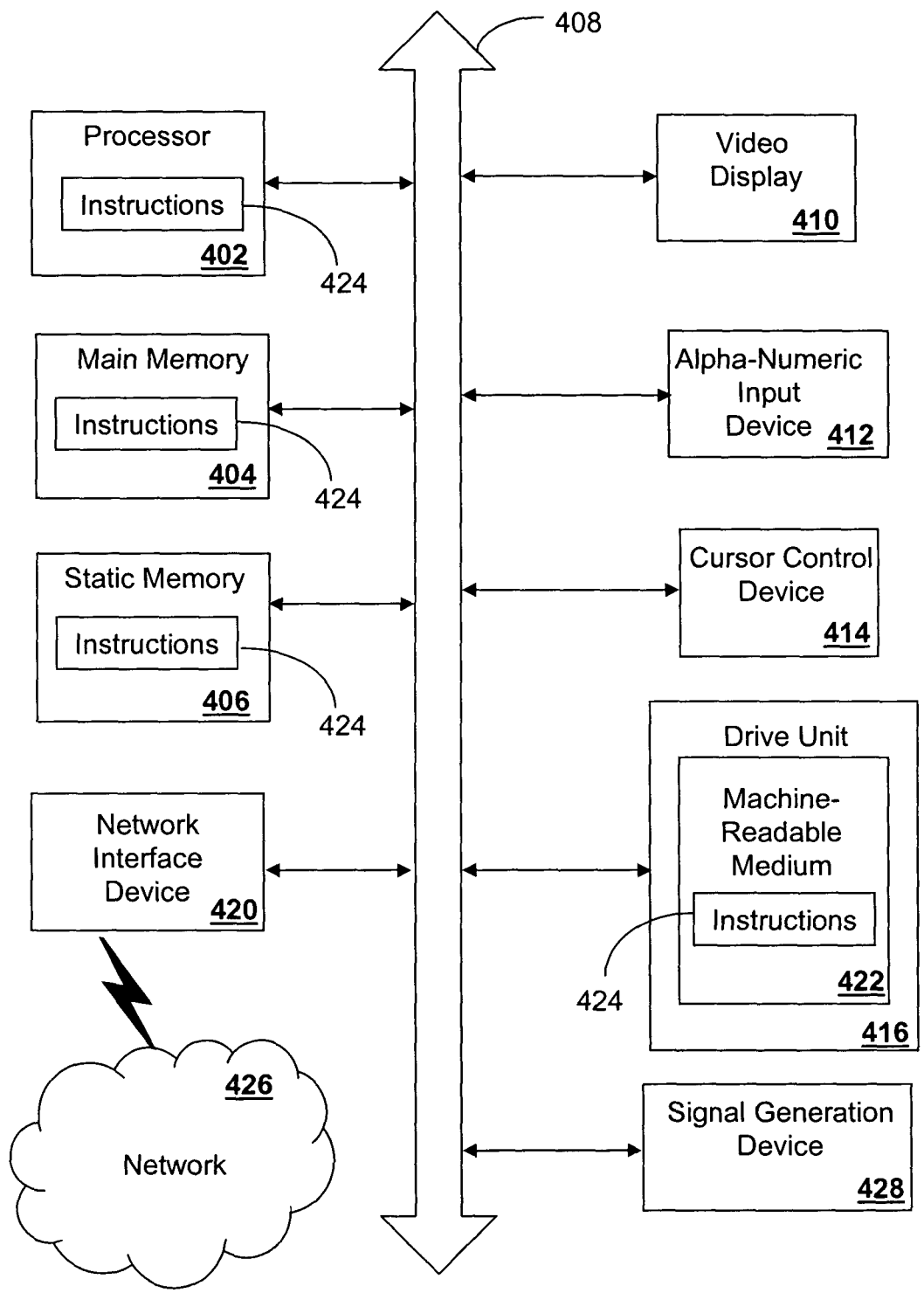
FIG. 5 is a diagrammatic representation of a machine in the form of a computer system within which a set of instructions, when executed, may cause the machine to perform any one or more of the methodologies discussed herein

FIG. 5 is a diagrammatic representation of a machine in the form of a computer system 400 within which a set of instructions, when executed, may cause the machine to perform any one or more of the methodologies discussed above. In some embodiments, the machine operates as a standalone device. In some embodiments, the machine may be connected (e.g., using a network) to other machines. In a networked deployment, the machine may operate in the capacity of a server or a client user machine in server-client user network environment, or as a peer machine in a peer-to-peer (or distributed) network environment. The machine may comprise a server computer, a client user computer, a personal computer (PC), a tablet PC, a laptop computer, a desktop computer, a control system, a network router, switch or bridge, or any machine capable of executing a set of instructions (sequential or otherwise) that specify actions to be taken by that machine. It will be understood that a device of the present disclosure includes broadly any electronic device that provides voice, video or data communication. Further, while a single machine is illustrated, the term "machine" shall also be taken to include any collection of machines that individually or jointly execute a set (or multiple sets) of instructions to perform any one or more of the methodologies discussed herein.

The computer system 400 may include a processor 402 (e.g., a central processing unit (CPU), a graphics processing unit (GPU, or both), a main memory 404 and a static memory 406, which communicate with each other via a bus 408. The computer system 400 may further include a video display unit 410 (e.g., a liquid crystal display (LCD), a flat panel, a solid state display, or a cathode ray tube (CRT)). The computer system 400 may include an input device 412 (e.g., a keyboard), a cursor control device 414 (e.g., a mouse), a disk drive unit 416, a signal generation device 428 (e.g., a speaker or remote control) and a network interface device 420.

The disk drive unit 416 may include a machine-readable medium 422 on which is stored one or more sets of instructions (e.g., software 424) embodying any one or more of the methodologies or functions described herein, including those methods illustrated in herein above. The instructions 424 may also reside, completely or at least partially, within the main memory 404, the static memory 406, and/or within the processor 402 during execution thereof by the computer system 400. The main memory 404 and the processor 402 also may constitute machine-readable media. Dedicated hardware implementations including, but not limited to, application specific integrated circuits, programmable logic arrays and other hardware devices can likewise be constructed to implement the methods described herein. Applications that may include the apparatus and systems of various embodiments broadly include a variety of electronic and computer systems. Some embodiments implement functions in two or more specific interconnected hardware modules or devices with related control and data signals communicated between and through the modules, or as portions of an application-specific integrated circuit. Thus, the example system is applicable to software, firmware, and hardware implementations.

In accordance with various embodiments of the present disclosure, the methods described herein are intended for operation as software programs running on a computer processor. Furthermore, software implementations can include, but not limited to, distributed processing or component/object distributed processing, parallel processing, or virtual machine processing can also be constructed to implement the methods described herein.

The present disclosure contemplates a machine readable medium containing instructions 424, so that a device connected to a network environment 426 can send or receive voice, video or data, and to communicate over the network 426 using the instructions 424. The instructions 424 may further be transmitted or received over a network 426 via the network interface device 420.

While the machine-readable medium 422 is shown in an example embodiment to be a single medium, the term "machine-readable medium" should be taken to include a single medium or multiple media (e.g., a centralized or distributed database, and/or associated caches and servers) that store the one or more sets of instructions. The term "machine-readable medium" shall also be taken to include any medium that is capable of storing, encoding or carrying a set of instructions for execution by the machine and that cause the machine to perform any one or more of the methodologies of the present disclosure.

The term "machine-readable medium" shall accordingly be taken to include, but not be limited to: solid-state memories such as a memory card or other package that houses one or more read-only (non-volatile) memories, random access memories, or other re-writable (volatile) memories; and magneto-optical or optical medium such as a disk or tape; and/or a digital file attachment to e-mail or other self-contained information archive or set of archives is considered a distribution medium equivalent to a tangible storage medium. Accordingly, the present disclosure is considered to include any one or more of a machine-readable medium or a distribution medium, as listed herein and including art-recognized equivalents and successor media, in which the software implementations herein are stored.

Although the present specification describes components and functions implemented in the embodiments with reference to particular standards and protocols, the disclosure is not limited to such standards and protocols. Each of the standards for Internet and other packet switched network transmission (e.g., TCP/IP, UDP/IP, HTML, HTTP) represent examples of the state of the art. Such standards are periodically superseded by faster or more efficient equivalents having essentially the same functions. Accordingly, replacement standards and protocols having the same functions are considered equivalents.

The illustrations of embodiments described herein are intended to provide a general understanding of the structure of various embodiments, and they are not intended to serve as a complete description of all the elements and features of apparatus and systems that might make use of the structures described herein. Many other embodiments will be apparent to those of skill in the art upon reviewing the above description. Other embodiments may be utilized and derived therefrom, such that structural and logical substitutions and changes may be made without departing from the scope of this disclosure. For example, method 300 can be reduced to steps 302, 304, 306 and 312 without departing from the scope of the claims described below. Figures are also merely representational and may not be drawn to scale. Certain proportions thereof may be exaggerated, while others may be minimized. Accordingly, the specification and drawings are to be regarded in an illustrative rather than a restrictive sense.

Such embodiments of the inventive subject matter may be referred to herein, individually and/or collectively, by the term "invention" merely for convenience and without intending to voluntarily limit the scope of this application to any single invention or inventive concept if more than one is in fact disclosed. Thus, although specific embodiments have been illustrated and described herein, it should be appreciated that any arrangement calculated to achieve the same purpose may be substituted for the specific embodiments shown. This disclosure is intended to cover any and all adaptations or variations of various embodiments. Combinations of the above embodiments, and other embodiments not specifically described herein, will be apparent to those of skill in the art upon reviewing the above description.

The Abstract of the Disclosure is provided to comply with 37 C.F.R. §1.72(b), requiring an abstract that will allow the reader to quickly ascertain the nature of the technical disclosure. It is submitted with the understanding that it will not be used to interpret or limit the scope or meaning of the claims. In addition, in the foregoing Detailed Description, it can be seen that various features are grouped together in a single embodiment for the purpose of streamlining the disclosure. This method of disclosure is not to be interpreted as reflecting an intention that the claimed embodiments require more features than are expressly recited in each claim. Rather, as the following claims reflect, inventive subject matter lies in less than all features of a single disclosed embodiment. T Thus the following claims are hereby incorporated into the Detailed Description, with each claim standing on its own as separately claimed subject matter.

What is claimed is:

1. A non-transitory computer-readable storage medium in a customer relationship management system for managing a communication network, the storage medium comprising computer instructions for:
   selecting an Internet Protocol address to analyze;
   monitoring for malicious events originating from the Internet Protocol address;
   detecting a malicious event at the Internet Protocol address;
   providing a record of the malicious event in account information corresponding to a user associated with the Internet Protocol address;
   restricting access to the communication network for the user associated with the Internet Protocol address based on detection of the malicious event at the Internet Protocol address;
   after restricting access to the communication network, determining that a device of the user corresponding to the Internet Protocol address comprises out-of-date software operating on the device of the user violating terms of service for accessing the communication network;
   in response to determining that the device violates the terms of service for accessing the communication network, providing a first notification to the user regarding violation of the terms of service, instructions to the user on mitigating violation of the terms of service, a second notification to the user that access to the network for the user is restricted, and an option to the user to remedy the malicious event;
   receiving a request from the user to remove a restriction of access to the communication network for the user associated with the Internet Protocol address; and
   in response to receiving the request:
      removing the restriction of access to the communication network, and
      after removing the restriction of access, continuing to analyze the Internet Protocol address before removing the record from the account information corresponding to the user.

2. The storage medium of claim 1, comprising further computer instructions for:
   after restricting access to the communication network, receiving a request from the user for support from an agent of the communication network to provide unrestricted access to the communication network for the user;
   routing the user to the agent;
   informing the agent of the malicious event originating from the Internet Protocol address associated with the user; and
   presenting to the agent information regarding at least a portion of activities occurring at the Internet Protocol address while the Internet Protocol address was monitored for originating the malicious events.

3. The storage medium of claim 1, comprising further computer instructions for disabling use of the Internet Protocol address originating the malicious event.

4. A controller including a customer relationship management system for managing operations of a communication network, the controller comprising:
   a communication element for monitoring data traffic of Internet Protocol addresses in the communication network and for controlling operations of the communication network;
   a memory; and
   a processor for controlling operations of the communication element, and the memory, wherein the processor is programmed to:
      select an Internet Protocol address of the Internet Protocol addresses monitored to analyze,
      monitor for malicious events originating from the Internet Protocol address,
      detect a malicious event at the Internet Protocol address,
      provide a record of the malicious event in account information corresponding to a user associated with the Internet Protocol address;
      restrict access to the communication network for the user associated with the Internet Protocol address based on detection of the malicious event at the Internet Protocol address,
      after restricting access to the communication network, determine that a device of the user corresponding to the Internet Protocol address comprises out-of-date software operating on the device of the user violating terms of service for accessing the communication network,
      in response to determining that the device violates the terms of service for accessing the communication network, provide a first notification to the user regarding violation of the terms of service, instructions to the user on mitigating violation of the terms of service, a second notification to the user that access to the network for the user is restricted, and an option to the user to remedy the malicious event
      receive a request from the user to remove a restriction of access to the communication network for the user associated with the Internet Protocol address, and
      in response to receiving the request:
         remove the restriction of access to the communication network, and
         after removing the restriction of access, continue to analyze the Internet Protocol address before removing the record from the account information corresponding to the user.

5. The controller of claim 4, wherein the processor is further programmed to:
   after restricting access to the communication network, receive a request from the user for support from an agent of the communication network to provide unrestricted access to the communication network for the user;
   route the user to the agent;
   inform the agent of the malicious event originating from the Internet Protocol address associated with the user; and
   present to the agent information regarding at least a portion of activities occurring at the Internet Protocol address while the Internet Protocol address was monitored for originating the malicious events.

6. The controller of claim 4, wherein the processor is further programmed to:
   access the account information of the user; and
   update the account information of the user to restrict access to the communication network.

7. The controller of claim 4, wherein the processor is further programmed to disable use of the Internet Protocol address originating the malicious event.

8. A method for managing a communication network, the method comprising:
   selecting, by a processor, an Internet Protocol address to analyze;

monitoring for malicious events originating from the Internet Protocol address;

detecting a malicious event at the Internet Protocol address;

providing a record of the malicious event in account information corresponding to a user associated with the Internet Protocol address;

restricting access to the communication network for the user associated with the Internet Protocol address based on detection of the malicious event at the Internet Protocol address;

after restricting access to the communication network, determining that a device of the user corresponding to the Internet Protocol comprises out-of-date software operating on the device of the user violating terms of service for accessing the communication network;

in response to determining that the device violates the terms of service for accessing the communication network, providing a first notification to the user regarding violation of the terms of service, instructions to the user on mitigating violation of the terms of service, a second notification to the user that access to the network for the user is restricted, and an option to the user to remedy the malicious event;

receiving a request from the user to remove a restriction of access to the communication network for the user associated with the Internet Protocol address; and in response to receiving the request:
  removing the restriction of access to the communication network, and
  after removing the restriction of access, continuing to analyze the Internet Protocol address before removing the record from the account information corresponding to the user.

9. The method of claim 8, further comprising:

after restricting access to the communication network, receiving a request from the user for support from an agent of the communication network to provide unrestricted access to the communication network for the user;

routing the user to the agent;

informing the agent of the malicious event originating from the Internet Protocol address associated with the user; and presenting to the agent information regarding at least a portion of activities occurring at the Internet Protocol address while the Internet Protocol address was monitored for originating the malicious events.

10. The method of claim 1, further comprising disabling use of the Internet Protocol address originating the malicious event.

* * * * *